United States Patent [19]

Bloomquist et al.

[11] Patent Number: 5,141,402
[45] Date of Patent: Aug. 25, 1992

[54] POWER TRANSMISSION

[75] Inventors: James V. Bloomquist, Bloomfield Hills; Albin J. Niemic, Sterling Heights, both of Mich.

[73] Assignee: Vickers, Incorporated, Troy, Mich.

[21] Appl. No.: 647,609

[22] Filed: Jan. 29, 1991

[51] Int. Cl.$^5$ .............................................. F04B 49/06
[52] U.S. Cl. .......................................... 417/5; 417/22; 417/32; 417/45; 417/217; 417/356
[58] Field of Search ..................... 417/5, 6, 22, 32, 42, 417/45, 217, 356

[56] References Cited

U.S. PATENT DOCUMENTS

| | | | |
|---|---|---|---|
| 4,145,161 | 3/1979 | Skinner | 417/45 |
| 4,510,750 | 4/1985 | Izumi et al. | 417/222 R |
| 4,655,689 | 4/1987 | Westveer et al. | 417/222 R |
| 4,726,738 | 2/1988 | Nakamura et al. | 417/42 |
| 4,729,717 | 3/1988 | Gupta | 417/356 |

Primary Examiner—Richard A. Bertsch
Assistant Examiner—David W. Scheuermann
Attorney, Agent, or Firm—Barnes, Kisselle, Raisch, Choate, Whittemore & Hulbert

[57] ABSTRACT

An electric-motor hydraulic pump includes a housing having a stationary internal shaft. A pair of cylinder blocks are rotatably carried by the shaft within the housing, and an array of pistons are slidably disposed with each cylinder block. A yoke plate is mounted within the housing and engages the pistons for determining displacement of the pistons within the cylinder blocks. Fluid inlet and outlet ports are provided in the housing and are coupled to the cylinder blocks. An induction motor includes a rotor carried by the cylinder block for corotation therewith, and a stator mounted within the housing surrounding the rotor. An electronic controller for controlling outlet fluid pressure and flow from the pump includes a plurality of sensors mounted on the housing for sensing operating characteristics of the pump and motor to provide electronic sensor signals as functions thereof. Control electronics are responsive to the sensor signals for controlling fluid pressure and flow from the pump by varying effective displacement of the pump, and by varying the electrical power (current and frequency) applied to the motor.

13 Claims, 4 Drawing Sheets

POWER TRANSMISSION

A present invention is directed to an electric-motor hydraulic pump, and more particularly to a pump that includes facility for regulating fluid output by controlling electrical power applied to the pump motor.

BACKGROUND AND OBJECTS OF THE INVENTION

U.S. Pat. No. 4,729,717, assigned to the assignee hereof, discloses and electric-motor in-line hydraulic pump assembly that includes a stationary shaft disposed within a housing. A pair of spaced cylinder blocks are counter rotatably mounted on the shaft, and arrays of pistons are carried within each of the cylinder blocks and engage opposite side of a common yoke plate. Synchronous or asynchronous (induction) motor stators are positioned within the housing and surround rotors mounted on the cylinder blocks. A controller energizes the respective motors so that the cylinder blocks rotate in opposite directions and can be held 180° out of phase with each other. A yoke plate control piston and pressure compensator valve are carried by the housing and coupled to the pump fluid output for maintaining constant output pressure and destroking the pump when fluid output pressure exceeds the desired level.

U.S. application Ser. No. 07/412,211 filed Sep. 25, 1989, now U.S. Pat. No. 5,073,091 likewise assigned to the assignee hereof, discloses a variable displacement hydraulic pump that includes a housing and a rotatable shaft that projects from the housing for external connection to a motor or other source of motive power. A cylinder block is coupled to the shaft for corotation with the shaft within the housing, and includes a plurality of cylinders disposed in a circumferential array parallel to and surrounding the axis of the shaft. A piston is disposed to reciprocate within each of the cylinders, and is coupled to a yoke plate for determining displacement of the pistons within the cylinders. A valve plate is mounted on a valve block and includes kidney-shaped slots for registering with the cylinders as the cylinder block rotates, and thereby connecting the cylinders to pump inlet and outlet ports. A microprocessor-based controller is externally mounted on the pump valve block, and includes internal memory having various remotely-selectable control programs prestored therein. Sensors responsive to pump operating conditions are connected to the pump controller, and include a first sensor responsive to yoke plate position as variable controlled by the controller, a pressure sensor responsive to pump output pressure, and a speed sensor responsive to angular velocity of rotation of the shaft and cylinder block. Preferably, all of the electric components are mounted on the valve block.

A general object of the present invention is to provide an electric-motor hydraulic pump of the type disclosed in the above-noted patent that includes facility for enhanced control of pump output fluid pressure and flow. Another and more specific object of the present invention is to provide an electric-motor hydraulic pump of the described character in which effective pump displacement and speed are controlled electronically by modulating the output of the electric motor, rather then hydro-mechanically as is typical of the prior art, so as to reduce power consumption . Yet another object of the present invention is to provide an electric-motor hydraulic pump having improved response to changing output commands and/or conditions.

SUMMARY OF THE INVENTION

An electric-motor hydraulic pump in accordance with the present invention includes a housing having a stationary internal shaft. At least one cylinder block is rotatably carried by the shaft within the housing, and at least one piston is slidably disposed with the cylinder block. A yoke plate is mounted within the housing and engages the piston for determining displacement of the piston within the cylinder block. Fluid inlet and outlet ports are provided in the housing and are coupled to the cylinder block. An electric-motor includes a rotor carried by the cylinder block for corotation therewith, and a stator mounted within the housing surrounding the rotor. An electronic controller for controlling outlet fluid pressure and flow from the pump includes a plurality of sensors mounted on the housing for sensing operating characteristics of the pump and motor to provide electronic sensor signals as functions thereof. Control electronics are responsive to the sensor signals for controlling fluid pressure and/or flow from the pump by varying the torque and speed of the pump motor.

In accordance with another aspect of the invention, and in a presently preferred embodiment thereof, the pump motor comprises an electric motor (synchronous or asynchronous), and the controller includes circuitry for applying an alternating current to the stator of the electric motor. A speed command signal is generated in the controller indicative of desired speed of rotation at the cylinder block and rotor, and the frequency of the alternating current applied to the stator is varied as a function of such speed command signal. A pressure command signal indicative of a desired pump outlet fluid pressure is generated at the controller, and amplitude of the alternating current applied to the stator is varied as a function of such pressure command signal. In this way, outlet pressure and flow of fluid from the pump are selectively variable as a function of such command signals through variable control of electric power applied to the stator. Thus, hydraulic power is delivered to the load at a level required to do the desired work, minimizing excess and resultant losses.

In the preferred embodiment of the invention, speed and pressure sensors are mounted on the motor/pump unit, and provide electrical signals as respective functions of motor speed and pump output pressure for comparison to the corresponding command signals. Frequency and amplitude of the alternating current applied to the motor stator are controlled as respective functions of differences between the corresponding sensor and command signals. The preferred embodiment of the invention also includes a temperature sensor within the motor/pump housing for sensing temperature of hydraulic fluid flowing therethrough, and the speed command signal is automatically varied within the controller as a function of fluid temperature so as to increase pump speed and effective pump displacement as fluid temperature increases. In this way, increased leakage due to decreased fluid viscosity at increased temperature is automatically accommodated through electronic control of the pump motor. The preferred embodiment of the invention also includes a sensor operatively coupled to the yoke plate within the housing for sensing actual displacement of the piston within the cylinder block, and the pressure command signal generated by the pump controller is automatically varied as a function of actual pump displacement so as to increase torque applied by the motor to the pump as actual pump displacement increases.

BRIEF DESCRIPTION OF THE DRAWINGS

The invention, together with additional objects, features and advantages thereof, will be best understood from the following description, the appended claims and the accompanying drawings in which:

DETAIL DESCRIPTION OF PREFERRED EMBODIMENTS

Figure 1:
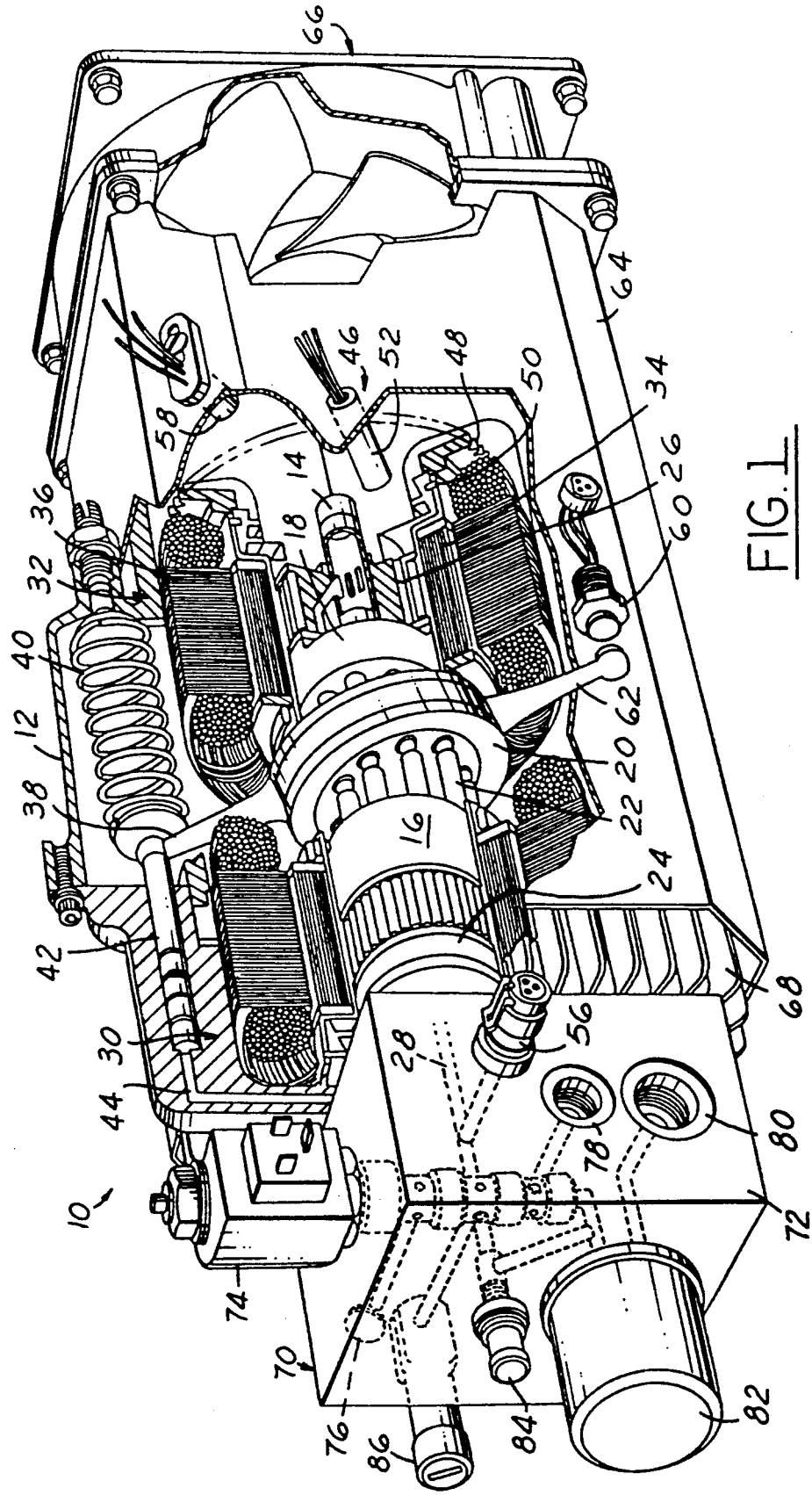
FIG. 1 is a partially sectioned perspective view of an electric-motor in-line hydraulic pump assembly in accordance with a presently preferred embodiment of the invention.

FIG. 1 illustrates an electric-motor in-line hydraulic shaft 14 extending longitudinally therethrough. A pair of cylinder blocks 16, 18 are supported for rotation on fixed shaft 14 on opposite sides of a yoke plate 20. An array of pistons 22 are slidably carried in corresponding bores of each cylinder block 16, 18 circumferentially surrounding the axis of rotation, and extend axially from the respective cylinder blocks to engage opposing faces of yoke plate 20. Thus, yoke plate 20 determines physical displacement of pistons 22 in each cylinder block 16, 18. Each cylinder block 16, 18 communicates with a corresponding valve plate 24, 26 that contain suitable passages for feeding fluid at inlet pressure to the cylinders of the cylinder blocks, and for feeding fluid at outlet pressure to the internal passage within shaft 14, and thence to an outlet port 28.

An electric motor 30, 32 surrounds each cylinder block 16, 18 for rotating the cylinder block in opposite directions around shaft 14. Each motor 30, 32 includes a rotor 34 carried by the corresponding cylinder block for corotation therewith, and a stator 36 carried within housing 12 and radially outwardly surrounding the corresponding rotor 34. An arm 38 extends radially outwardly from the periphery of yoke plate 20. The outer end of arm 38 is engaged on one side by a coil spring 40, and on the opposing side by a control piston 42. The arm-remote end of control piston 42 receives fluid at outlet pressure through a passage 44 within housing 12.

In general, stators 36 of motors 30, 32 are energized so as to rotate motors 34 and cylinder blocks 16, 18 in opposite directions around shaft 14. Reciprocation of pistons 22 within cylinder blocks 16, 18 feeds fluid through valve plates 24, 26 and shaft 14 to outlet port 28. Fluid at outlet pressure is also fed to control piston 42, which operates against spring 40 to destroke the pump, by pivoting yoke plate 20, when outlet fluid pressure exceeds the level determined by spring 40. To the extent thus far described, pump 10 is substantially the same as that disclosed in U.S. Pat. No. 4,729,717, to which reference is made for a more detailed description of construction and operation.

Figure 2:
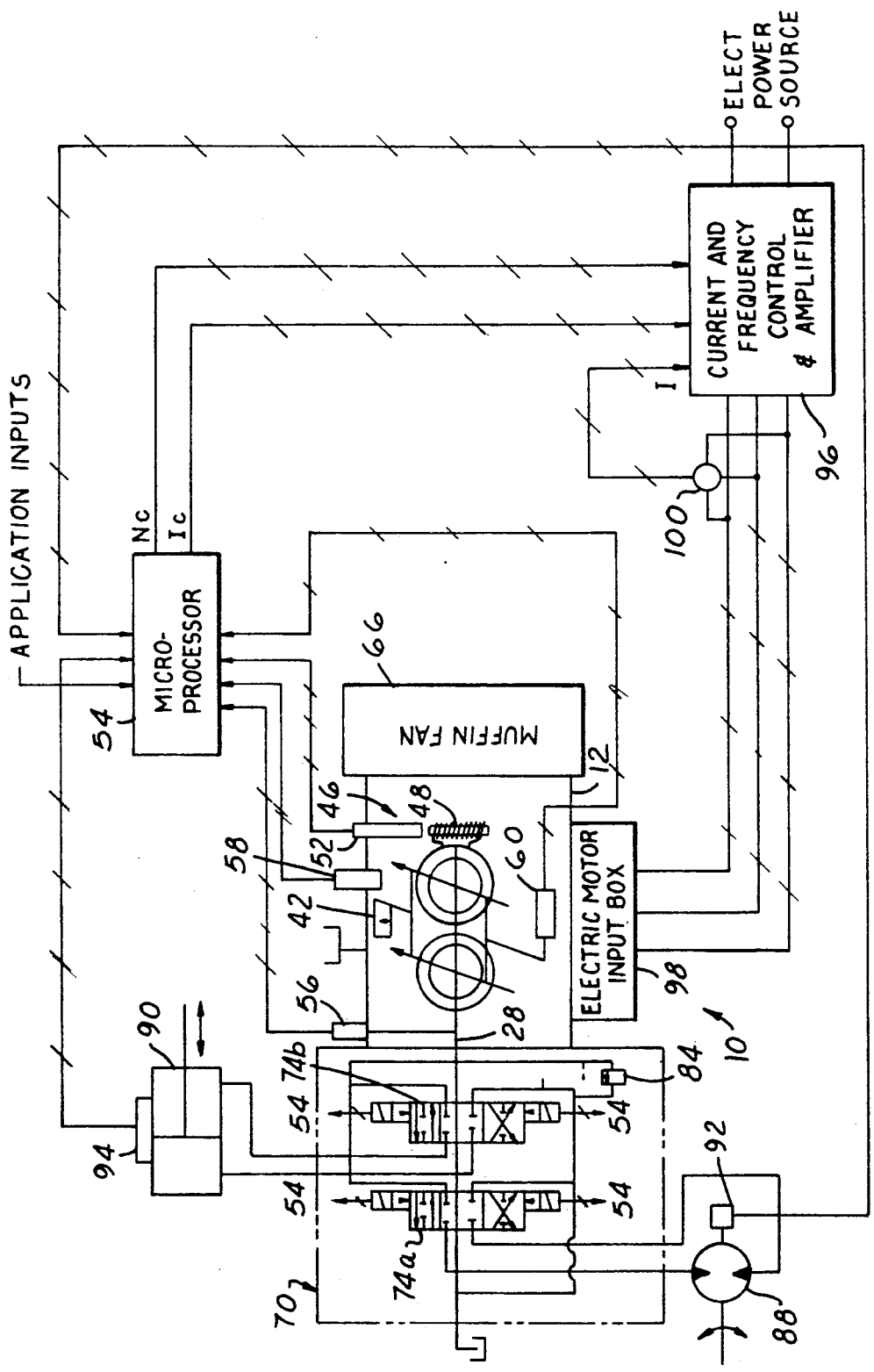
FIG. 2 is a electrohydraulic schematic diagram of the pump illustrated in FIG. 1 with associated control electronics and exemplary loads.

Referring to both FIGS. 1 and 2, a plurality of sensors are mounted on pump 10 for sensing operating characteristics of the pump and to provide electronic sensor signals as functions thereof. These sensor include a pump speed sensor 46 comprising a toothed wheel 48 carried by the pump inlet inducer 50 (FIG. 1) for corotation with cylinder block 18, and a pick-up assembly 52 positioned radially outwardly of wheel 48 in proximity thereto. Pick-up 52 thus feeds a periodic signal N (FIG. 4) indicative of pump angular velocity to a microprocessor-based pump controller 54 (FIG. 2). A pressure sensor 56 is coupled to pump outlet port 28 for feeding a signal P to controller 54 indicative of pump outlet pressure. A temperature sensor 58 is carried by housing 12, and feeds a corresponding sensor signal T to controller 54 indicative of the temperature of hydraulic fluid at case pressure surrounding the motor and cylinder blocks. A position sensor 60 is disposed within housing 12 in proximity to the distal end of an arm 62 that projects from yoke plate 20, and feeds a signal Y to microprocessor-based controller 54 indicative of position of yoke plate 20 relative to the case. Housing 12 is surrounded by a shell 64. A constant speed muffin fan 66 is mounted on one end of housing 12, and blows air longitudinally through the space between housing 12 and shell 64. Cooling fins 68 (FIG. 1) on shell 12 help dissipate heat into the air stream.

A valve block assembly 70 is mounted on the end of housing 12 remote from fan 66. Valve block assembly 70 includes a manifold 72 having internal passages that communicate with outlet port 28 of pump housing 12 and feed fluid at outlet pressure to a solenoid-operated directional control valve 74. Valve 74 is operated by controller 54 (FIG. 2) for selectively feeding fluid at outlet pressure to a pair of work port 76, 78. Return fluid is fed within block 72 from a return port 80 through a filter 82 and returned to the pump case. A pressure relief valve 84 is mounted on block 72 for returning outlet fluid to the case in the event of excess outlet pressure, and a pressure compensator 86 is also carried by manifold 72 of valve block assembly 70. FIG. 2 illustrates a modified embodiment of the invention in which the valve block assembly 70 carries a pair of directional valves 74a, 74b, with solenoids connected to microprocessor-based control 54. Valve 74a selectively feeds fluid to a rotary hydraulic actuator 88, while valve 74b selectively feeds fluid to a linear hydraulic actuator 90. Each actuator 88, 90 has a position sensor 92, 94 associated therewith for feeding signals to controller 54 indicative of actuator position.

A current, frequency and amplifier controller 96 receives electrical power from a suitable source (not shown), and feeds three-phase alternating current at controlled amplitude and frequency to an electric motor control 98 carried by housing 12 of pump 10. Control 98 includes suitable control circuitry (as shown in the above-referenced patent) for feeding the alternating current to the stator windings of the respective motors 30, 32 (FIG. 1) 180° out of phase. A current sensor 100 is connected to the output of current, frequency and amplifier controller 96. Microprocessor 54 provides a pair of control outputs to current, frequency and amplifier controller 96, which provides amplitude and frequency control to motors 30, 32. Devices suitable for control 96 are marketed by ABB Industrial Systems, Inc. of New Berlin, Wis. under the trade designation "GX Series."

Figure 3:
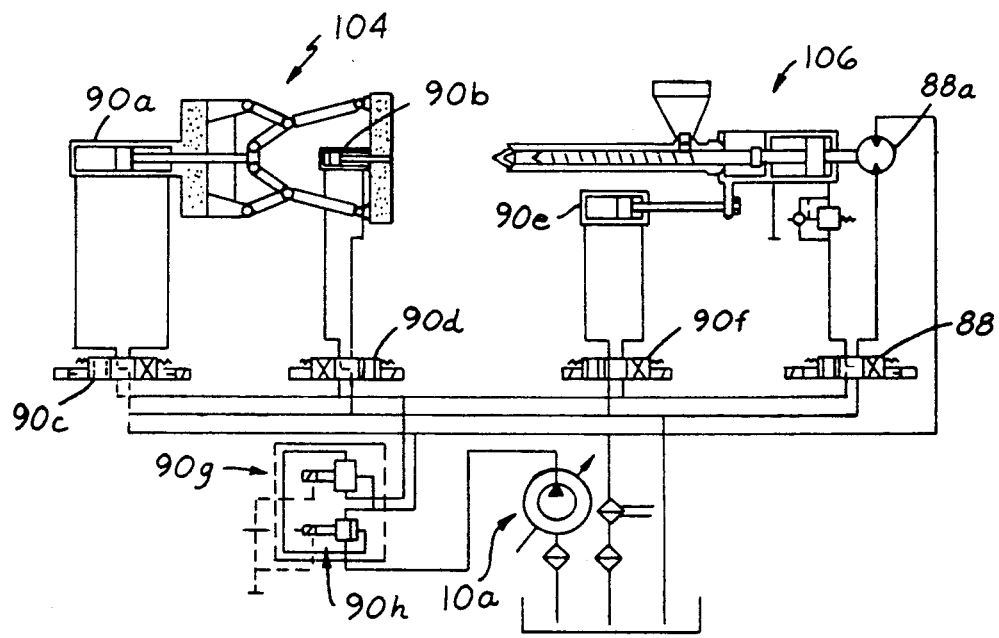
FIG. 3 is a hydraulic schematic diagram of the electric-motor fixed displacement pump in an exemplary application for controlling operation of injection molding machinery.
Figure 5:
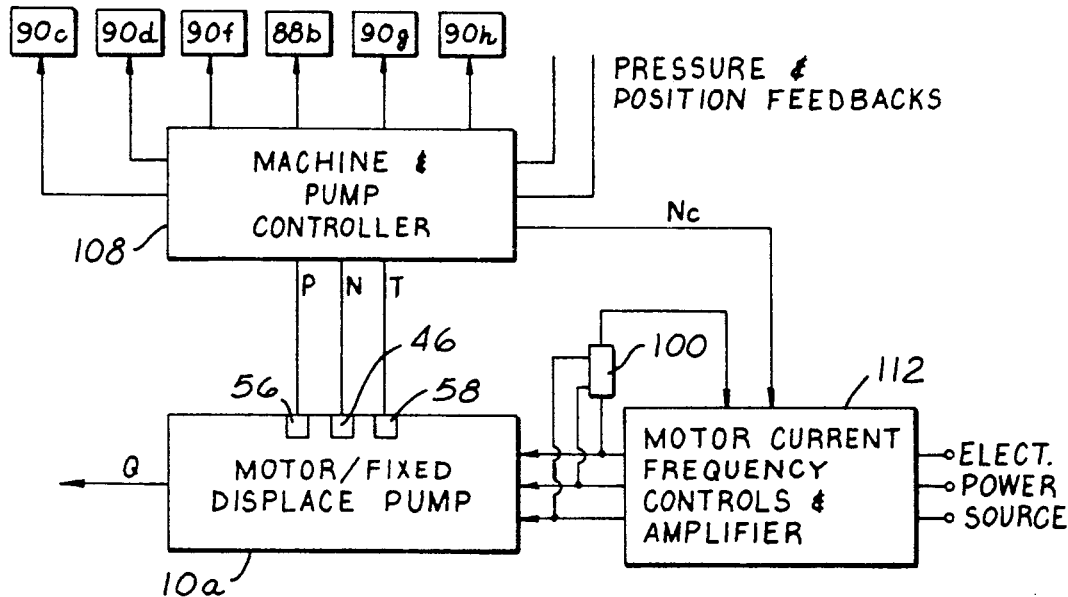
FIG. 5 is a functional block diagram of the motor/pump and control electronics illustrated in FIG. 3.

FIGS. 3 and 5 illustrate implementation of the invention in a fixed displacement pump and control arrangement in an injection molding application for controlling operation of the mold clamp 104 and material ejector 106 of a conventional injection molding machine. Clamp 104 includes a pair of linear actuator 90a, 90b, controlled by the respective solenoid valves 90c, 90d, for operating the two components of the clamp. Injector 106 includes a rotary actuator 88a for operating the injector screw, and a linear actuator 90e coupled to the injector ram. Actuators 88a, 90e are controlled by proportional valves 88b, 90f. For each machine phase, the proportional valves 90g and 90h are suitably positioned by electrical signals efficiently to regulate the velocity and hydrostatic force on the machine actuators.

The regulation of the hydraulic speed and pressure related machinery functions are set at control panel 108 which can consist of digital and/or analog keyboard. The position and force at the actuators are measured and fed into the machine controller. This information is compared with the input setting and corrective feedback signals are sent to the proportional valves 90g and 90y. This comparative and corrective sequence of signals is continuous to meet the preset requirements. During the time the proportional valves 90g and 90h are responding to the programmed flow and pressure, the power to the electric motor/"fixed displacement" pump unit would be modulated (adjustment of the electrical current and frequency) to meet the "near" exact hydraulic power requirements without excess energy losses.

Figure 4:
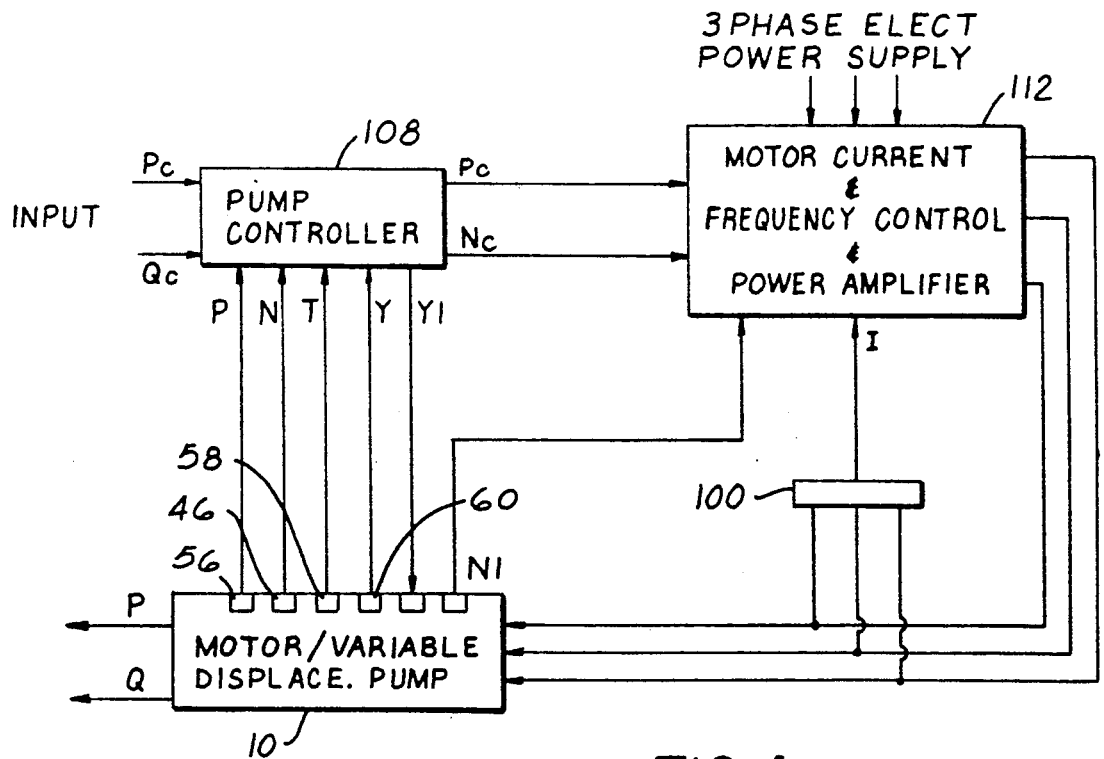
FIG. 4 is a functional block diagram of an electric motor variable displacement pump and control electronics.

FIG. 4 is a functional block diagram that illustrates control of electric motor/variable displacement pump 10. A pump controller 108 within microprocessor 54 generates command signals Pc and Nc indicative of desired pump outlet pressure and flow respectively. Command generator 108 receives the signal T from temperature sensor 58, and adjusts effective displacement of pump 10 by increasing pump speed command signal Nc to make up for increased leakage of hydraulic at higher temperature and, therefore, lower viscosity. Controller 108 also receives signal Y from yoke plate position sensor 60, and controls displacement of pump 10 by means of a displacement control signal Y1 provided to a suitable displacement control mechanism within the motor/pump unit.

Speed command signal Nc is compared to the actual speed signal N, and a corresponding error signal is fed to the pump power control circuit 112 for controlling frequency of the alternating current applied to the pump windings, and thereby controlling speed of pump operation. Likewise, pressure command signal Pc is compared with the actual pump outlet pressure signal P, and a signal is generated as a function of a difference therebetween for controlling amplitude of the current applied to the pump motor stator windings. The current command signal is also compared with the signal I returned by the current sensor 100 for fine-tuning the current applied to the motor windings. Above-noted U.S. application Ser. No. 07/412,211 filed Sep. 25, 1989 (V-4121) discloses a suitable construction for microprocessor-based controller 54. Pump control programs stored in the memory of the microprocessor are typically tailored to the specific application for which the motor-pump unit is to be employed, and do not per se form part of the present invention.

FIG. 5 illustrates a functional block diagram for control of motor/fixed displacement pump 10a. A controller 108 generator command Nc indicative of desired pump speed (discharge flow). Also, the controller instructs the solenoid operated directional valves of their operating positions and the proportional valves of their pressure and flow settings. The machine actuators perform to the instructions dictated by controller 108. The position and force (pressure) measured at the actuators are fed back and compared at the controller 108, which subsequently modulates the proportional valves 90g, 90h. To provide required flow and/or pressure. As one machine operation is completed, the controller 108 energizes the valving for the next machine sequence. The operation of the actuator is again compared to the input instruction in the controller 108, and the pressure and flow control cycle is repeated. Once the operating conditions are satisfied at the actuators by the valving, the controller 108 provides the instruction to the motor control 112 to adjust input electric power frequency to the motor/fixed displacement pump, and the pump hydraulic output is modulated to efficiency meet the system demands. This electric power frequency adjustment can be made for the respective phases of the machine cycle.

In another simplified installation, the electric motor control 112 is replaced by a switch which energizes one or both of the rotating group of the dual pumping groups operating at constant motor speed. The displacement of each rotating group can be sized to meet the specific flow demands.

There have thus been disclosed several embodiments of an electric-motor in-line hydraulic pump that fully satisfy all of the objects and aimes previously set forth. Although the invention has been disclosed in connection with present preferred embodiments thereof, many modification and variations may be implemented without departing from the principles of the invention in their broadest aspects. For example, the pump may include a linear actuator or the like coupled to the pump displacement control for controlling position of yoke plate 20 and actual displacement of pistons 22 within cylinder blocks 16, 18. In such an application, induction motors 30, 32 may be fixed rather then variable speed. It may also be advantageous in many applications to incorporate a small pump in the pump assembly for circulating cooling fluid around the motor windings even at near zero displacement and fluid flow. It is also contemplated that electric servo motors may be employed rather then the induction motors 30, 32 illustrated in the drawing and hereinabove described.

Figure 6:
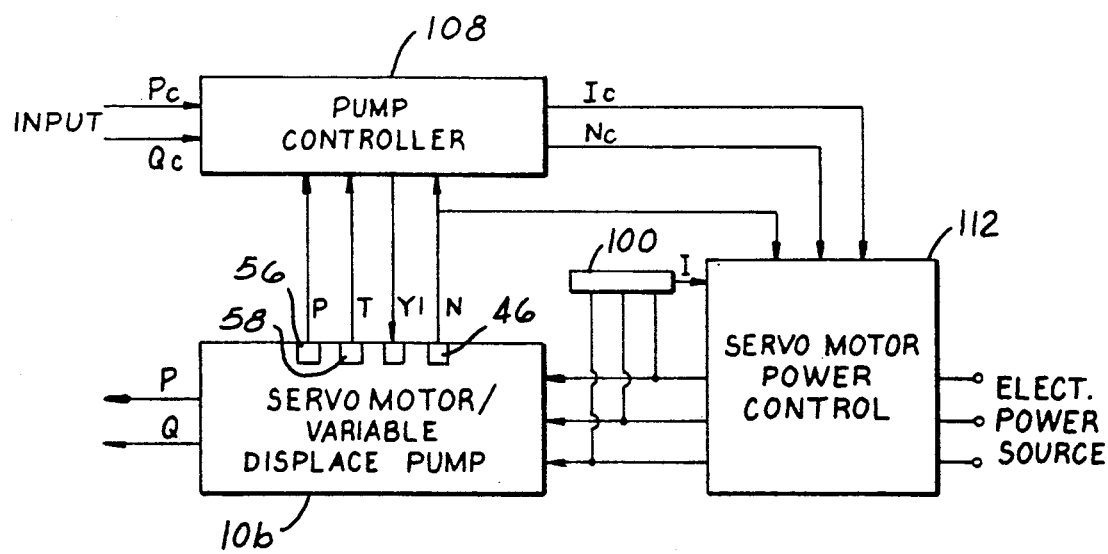
FIG. 6 is a functional block diagram of a servo motor/variable displacement pump and control electronics in accordance with another embodiment of the invention.

FIG. 6 illustrates the application of servo electric motor technology and/or servo pump displacement control to modulate pump flow (Q) or pressure (P). In a pressure control mode, the pump shaft speed (N), driven by the servo motor 10b, and the pump displacement (Y) can be varied by the controller to regulate pressure over wide speed (N) and displacement (Y) ranges. The variables of pump shaft speed (N) and displacement (Y) can be controlled to vary pump flow (Q) over side speed (N) and displacement (Y) ranges. Feedback of motor pump fluid temperature (T) and pump outlet pressure (P) are used to adjust (bias) pump shaft speed to make up for leakage. Both the servo motor and pump stroke displacement mechanism possess high dynamic performance characteristics to respond and meet the pressure (P) and flow (Q) requirements.

The motor-pump can include high performance electric servo motor of the asynchronous (induction) or synchronous (permanent magnet) types to dynamically control pump shaft speed to control either pump outlet flow or pressure. Another pressure control mode includes controlling the servo motor torque output via controller variation in current supplied to the electric servo motor.

We claim:

1. An electric-motor hydraulic pump that includes: a housing having a stationary internal shaft, at least one cylinder block rotatably carried by said shaft within said housing and at least one piston slidably disposed in said cylinder block, a yoke plate mounted within said housing and engaging said at least one piston for determining displacement of said piston within said cylinder block, fluid inlet and outlet means within said housing and coupled to said cylinder block, an electric motor that includes a rotor carried by said cylinder block within said housing for corotation therewith and a stator mounted within said housing surrounding said rotor, and electronic control means for controlling outlet fluid pressure and flow from said pump comprising:

a plurality of sensors mounted on said housing for sensing operating characteristics of said pump and said motor to provide electronic sensor signals as functions thereof, said sensors including a speed sensor for sensing speed of rotation of said rotor and providing a speed signal as a function thereof, a pressure sensor for sensing outlet fluid pressure from said pump and providing a pressure signal as a function thereof, and a temperature sensor in said housing for sensing temperature of hydraulic fluid flowing through said pump, and means responsive to said sensor signals for controlling application of electrical power to said stator for selectively varying speed of rotation of said rotor and said cylinder block about said shaft as a function of said sensor signals, and thereby controlling fluid pressure and flow from said pump by varying effective displacement of said pump, said power-controlling means including:

means for applying alternating current to said stator,
   means for generating a speed command signal as a function of desired speed at said motor and pump, means for comparing said speed signal to said speed command signal, and means for varying frequency of said alternating current applied to said stator as a function of a difference between said speed and speed command signals, and
   means for generating a pressure command signal as a function of desired outlet pressure from said pump, means for comparing said pressure signal to said pressure command signal, and means for varying amplitude of said alternating current applied to said stator as a function of a difference between said pressure and pressure command signals,
   said means for generating said speed command signal including means responsive to said temperature sensor for varying said speed command signal as a function of said fluid temperature so as to increase pump speed and effective pump displacement as fluid temperature increases.

2. An electric-motor hydraulic pump that includes: a housing having a stationary internal shaft, at least one cylinder block rotatably carried by said shaft within said housing and at least one piston slidably disposed in said cylinder block, a yoke plate mounted within said housing and engaging said at least one piston for determining displacement of said piston within said cylinder block, fluid inlet and outlet means within said housing and coupled to said cylinder block, an electric motor that includes a rotor carried by said cylinder block within said housing for corotation therewith and a stator mounted within said housing surrounding said rotor, and electronic control means for controlling outlet fluid pressure and flow from said pump comprising:

a plurality of sensors mounted on said housing for sensing operating characteristics of said pump and said motor to provide electronic sensor signals as functions thereof, said sensors including a pressure sensor for sensing outlet fluid pressure from said pump and providing a pressure signal as a function thereof, and a displacement sensor operatively coupled to said yoke plate for sensing actual displacement of said piston within said cylinder block, and means responsive to said sensor signals for controlling application of electrical power to said stator for selectively varying speed of rotation of said rotor and said cylinder block about said shaft as a function of said sensor signals, and thereby controlling fluid pressure and flow from said pump by varying effective displacement of said pump, said power-controlling means comprising:

means for applying alternating current to said stator, and
   means for generating a pressure command signal as a function of desired outlet pressure from said pump, means for comparing said pressure signal to said pressure command signal, and means for varying amplitude of said alternating current applied to said stator as a function of a difference between said pressure and pressure command signals,
   said means for generating said pressure command signal comprising means responsive to said displacement sensor for varying said pressure command signal as a function of said actual displacement so as to increase pump torque as said actual displacement increases.

3. An electric-motor hydraulic pump that includes: a housing having a stationary internal shaft, at least one cylinder block rotatably carried by said shaft within said housing and at least one piston slidably disposed in said cylinder block, a yoke plate mounted within said housing and engaging said at least one piston for determining displacement of said piston within said cylinder block, fluid inlet and outlet means within said housing and coupled to said cylinder block, an electric servo motor that includes a rotor carried by said cylinder block within said housing for corotation therewith and a stator mounted within said housing surrounding said rotor, an electronic control means for controlling outlet fluid pressure and flow from said pump comprising:

a plurality of sensors mounted on said housing for sensing operating characteristics of said pump and said motor to provide electronic sensor signals as functions thereof, and means responsive to said sensor signals for controlling fluid pressure and flow from said pump by varying effective displacement of said pump, said means responsive to said sensor signals comprising means for controlling application of electrical power to said stator for selectively varying speed of rotation of said rotor and said cylinder block about said shaft as a function of said sensor signals.

4. An electric-motor hydraulic pump that includes: a housing having a stationary internal shaft, at least one cylinder block rotatably carried by said shaft within said housing and at least one piston slidably disposed in said cylinder block, a yoke plate mounted within said housing and engaging said at least one piston for determining displacement of said piston within said cylinder block, fluid inlet and outlet means within said housing and coupled to said cylinder block, an electric motor that includes a rotor carried by said cylinder block within said housing for corotation therewith and a stator mounted within said housing surrounding said rotor, and electronic control means for controlling outlet fluid pressure and flow from said pump comprising:

a plurality of sensors mounted on said housing for sensing operating characteristics of said pump and said motor to provide electronic sensor signals as functions thereof, and means responsive to said sensor signals for controlling fluid pressure and flow from said pump by varying effective displacement of said pump, said means responsive to said sensor signals comprising means for controlling application of electrical power to said stator for selectively varying speed of rotation of said rotor and said cylinder block about said shaft as a function of said sensor signals, said power-applying means comprising switch means for selectively applying electrical power to said stator, said pump further comprising a manifold mounted on said housing coupled to said outlet means, at least one solenoid-operated proportional hydraulic valve on said manifold, and fluid ports on said manifold for feeding hydraulic fluid from said pump to a load under control of said proportional hydraulic valve.

5. An electric-motor hydraulic pump that includes: a housing having a stationary internal shaft, at least one cylinder block rotatably carried by said shaft within said housing and at least one piston slidably disposed in said cylinder block, a yoke plate mounted within said housing and engaging said at least one piston for determining displacement of said piston within said cylinder block, fluid inlet and outlet means within said housing and coupled to said cylinder block, an electric-motor that includes a rotor carried by said cylinder block within said housing for corotation therewith and a stator mounted within said housing surrounding said rotor, and electronic control means for controlling outlet fluid pressure and flow from said pump comprising:

a plurality of sensors mounted on said housing for sensing operating characteristics of said pump and said motor to provide electronic sensor signals as functions thereof, said sensors including a speed sensor for sensing speed of rotation of said rotor and providing a speed signal as a function thereof, and means responsive to said sensor signals for controlling fluid pressure and flow from said pump by varying effective displacement of said pump, said means responsive to said sensor signals comprising switch means for controlling application of electrical power to said stator by applying alternating current to said stator while controlling frequency and amplitude of said alternating current applied to said stator and thereby selectively varying rotation of said rotor and said cylinder block about said shaft as a function of said sensor signals, said means for controlling frequency of said alternating current comprising means for generating a speed command signal as a function of desired speed at said motor and pump, means for comparing said speed signal to said speed command signal, and means for varying frequency of said alternating current applied to said stator as a function of a difference between said speed and speed command signals.

6. An electric-motor hydraulic pump that includes: a housing having a stationary internal shaft, at least one cylinder block rotatably carried by said shaft within said housing and at least one piston slidably disposed in said cylinder block, a yoke plate mounted within said housing and engaging said at least one piston for determining displacement of said piston within said cylinder block, fluid inlet and outlet means within said housing and coupled to said cylinder block, an electric motor that includes a rotor carried by said cylinder block within said housing for corotation therewith and a stator mounted within said housing surrounding said rotor, and electronic control means for controlling outlet fluid pressure and flow from said pump comprising:

a plurality of sensors mounted on said housing for sensing operating characteristics of said pump and said motor to provide electronic sensor signals as functions thereof, said sensors including a pressure sensor for sensing outlet fluid pressure from said pump and providing a pressure signal as a function thereof, and means responsive to said sensor signals for controlling fluid pressure and flow from said pump by varying effective displacement of said pump, said means responsive to said sensor signals comprising:

switch means for controlling application of electrical power to said stator for selectively varying speed of rotation of said rotor and said cylinder block about said shaft as a function of said sensor signals, including means for applying alternating current to said stator, and means for controlling frequency and amplitude of said alternating current applied to said stator as a function of said sensor signals, said means for controlling amplitude of said alternating current comprising means for generating a pressure command signal as a function of desired outlet pressure form said pump, means for comparing said pressure signal to said pressure command signal, and means for varying amplitude of said alternating current applied to said stator as a function of a difference between said pressure and pressure command signals.

7. An electric-motor hydraulic pump that includes: a housing having a stationary internal shaft, at least one cylinder block rotatably carried by said shaft within said housing and at least one piston slidably disposed in said cylinder block, a yoke plate mounted within said housing and engaging said at least one piston for determining displacement of said piston within said cylinder block, fluid inlet and outlet means within said housing and coupled to said cylinder block, an electric motor that includes a rotor carried by said cylinder block within said housing for corotation therewith and a stator mounted within said housing surrounding said rotor, and electronic control means for controlling outlet fluid pressure and flow from said pump comprising:

a plurality of sensors mounted on said housing for sensing operating characteristics of said pump and said motor to provide electronic sensor signals as functions thereof, said sensors including a speed sensor for sensing speed of rotation of said rotor and providing a speed signal as a function thereof, and means responsive to said sensor signals for controlling fluid pressure and flow from said pump by varying effective displacement of said pump, said means responsive to said sensor signals comprising:

switch means for controlling application of electrical power to said stator for selectively varying speed of rotation of said rotor and said cylinder block about said shaft as a function of said sensor signals, including means for applying alternating current to said stator, and means for controlling frequency and amplitude of said alternating current applied to said stator as a function of said sensor signals, said means for controlling application of electrical power comprising means for generating a speed command signal as a function of desired speed at said motor and pump, means for comparing said speed signal to said speed command signal, and means for varying frequency of said alternating current applied to said stator as a function of a difference between said speed and speed command signals.

8. An electric-motor hydraulic pump that includes: a housing having a stationary internal shaft, at least one cylinder block rotatably carried by said shaft within said housing and at least one piston slidably disposed in said cylinder block, a yoke plate mounted within said housing and engaging said piston for determining displacement of said piston within said cylinder block, fluid inlet and outlet means within said housing and coupled to said cylinder block, an electric motor that includes a rotor carried by said cylinder block for corotation therewith and a stator within said housing surrounding said rotor, and electronic control means for controlling outlet fluid pressure and flow from said pump comprising:

means for applying alternating current to said stator, means for generating a speed command signal indicative of a desired speed of rotation of said cylinder block and said rotor, means for generating a pressure command signal indicative of a desired fluid outlet pressure at said pump, means for varying frequency of said alternating current applied to said stator as a function of said speed command signal, and means for varying amplitude of said alternating current applied to said stator as a function of said pressure command signal, outlet pressure and flow of fluid from said cylinder block being thereby selectively variable as a function of said command signals through variable control of both frequency and amplitude of alternating current applied to said stator.

9. The pump set forth in claim 8 further comprising a speed sensor on said housing for sensing speed of rotation of said rotor and providing a speed signal as a function thereof; and wherein said frequency-varying means comprises means for comparing said speed signal to said speed command signal, and means for varying frequency of said alternating current applied to said stator as a function of a difference between said speed and speed command signals.

10. The pump set forth in claim 8 further comprising a pressure sensor for sensing outlet fluid pressure from said pump and providing a pressure signal as a function thereof; and wherein said amplitude-varying means comprises means for comparing said pressure signal to said pressure command signal, and means for varying amplitude of said alternating current applied to said stator as a function of a difference between said pressure and pressure command signals.

11. The pump set forth in claim 8 further comprising a temperature sensor for sensing temperature of hydraulic fluid flowing through said pump; and wherein said means for generating said speed command signal includes means responsive to said temperature sensor for varying said speed command signal as a function of said fluid temperature so as to increase pump speed and effective pump displacement as fluid temperature increases.

12. The pump set forth in claim 8 further comprising a displacement sensor operatively coupled to said yoke plate within said housing for sensing actual displacement of said piston within said cylinder block; and wherein said means for generating said pressure command signal comprises means responsive to said displacement sensor for varying said pressure command signal as a function of said actual displacement so as to increase pump torque as said actual displacement increases.

13. The pump set forth in claim 8 further comprising a manifold mounted on said housing coupled to said outlet means, at least one solenoid-operated proportional hydraulic valve on said manifold, and fluid ports on said manifold for feeding hydraulic fluid from said pump to a load under control of said proportional hydraulic valve.

* * * * *